(12) United States Patent
Miller

(10) Patent No.: US 10,055,695 B2
(45) Date of Patent: Aug. 21, 2018

(54) THROTTLING SOLUTIONS INTO A LEGACY INVENTORY SYSTEM DURING A SERVICE DISRUPTION

(71) Applicant: Solution Technology Incorporated, Christ Church (BB)

(72) Inventor: Harold Roy Miller, Toronto (CA)

(73) Assignee: SOLUTION TECHNOLOGY INCORPORATED, Christ Church (BB)

( * ) Notice: Subject to any disclaimer, the term of this patent is extended or adjusted under 35 U.S.C. 154(b) by 485 days.

(21) Appl. No.: 14/918,117

(22) Filed: Oct. 20, 2015

(65) Prior Publication Data
US 2016/0125326 A1    May 5, 2016

Related U.S. Application Data

(60) Provisional application No. 62/066,281, filed on Oct. 20, 2014.

(51) Int. Cl.
*G06Q 10/02* (2012.01)
*G06Q 50/14* (2012.01)
*G06F 17/30* (2006.01)

(52) U.S. Cl.
CPC ............ *G06Q 10/02* (2013.01); *G06Q 50/14* (2013.01); *G06F 17/30575* (2013.01)

(58) Field of Classification Search
CPC ....... G06Q 10/02–10/025; G06Q 50/14; G06F 11/2082; G06F 11/2056; G06F 17/30174; G06F 17/30575
See application file for complete search history.

(56) References Cited

U.S. PATENT DOCUMENTS

| 6,314,361 B1 | 11/2001 | Yu et al. |
| 6,377,959 B1 | 4/2002 | Carlson |

(Continued)

FOREIGN PATENT DOCUMENTS

| CA | 2443832 A1 | 10/2002 |
| CA | 2569388 A1 | 7/2007 |

(Continued)

OTHER PUBLICATIONS

Sabre Launches New Profile Management Solution for Travel Agency Community, Sabre.com, Mar. 16, 2009.*

(Continued)

*Primary Examiner* — Daniel Vetter
(74) *Attorney, Agent, or Firm* — Banner & Witcoff, Ltd.

(57) ABSTRACT

A method for improved management of an airline inventory during a service disruption is described. The method comprises receiving, at a mirror of a legacy inventory system, one or more updates from a re-accommodation system. The mirror is populated with the one or more updates. The method proceeds with communicating the one or more updates to the legacy inventory system at a controlled rate. The one or more updates communicated to the legacy inventory system are flagged as pending update. A confirmation that the one or more records are updated in the legacy inventory system is received. The confirmation indicates synchronization of the mirror and legacy inventory system. In response to the confirmation, the one or more updates are unflagged in the mirror. Statistical evaluation of the inventory is provided based on the one or more updates in the mirror.

20 Claims, 7 Drawing Sheets

(56) References Cited

U.S. PATENT DOCUMENTS

| | | | |
|---|---|---|---|
| 7,103,797 B1* | 9/2006 | Wahl | G06F 9/50 |
| | | | 711/113 |
| 7,171,379 B2 | 1/2007 | Menninger et al. | |
| 2002/0059279 A1 | 5/2002 | Kim et al. | |
| 2003/0004772 A1* | 1/2003 | Dutta | G06Q 10/02 |
| | | | 718/100 |
| 2003/0177044 A1* | 9/2003 | Sokel | G06Q 10/02 |
| | | | 705/5 |
| 2003/0225600 A1 | 12/2003 | Slivka et al. | |
| 2004/0039613 A1* | 2/2004 | Maycotte | G06Q 10/02 |
| | | | 705/5 |
| 2004/0054550 A1 | 3/2004 | Cole et al. | |
| 2004/0204968 A1* | 10/2004 | Bertram | G06Q 10/02 |
| | | | 705/5 |
| 2004/0230472 A1 | 11/2004 | Venkat et al. | |
| 2005/0027579 A1 | 2/2005 | Tiourine et al. | |
| 2005/0125267 A1 | 6/2005 | Bramnick et al. | |
| 2011/0055770 A1* | 3/2011 | Hed | G06Q 10/02 |
| | | | 715/854 |
| 2012/0179516 A1 | 7/2012 | Fakhrai et al. | |
| 2012/0191651 A1* | 7/2012 | Irizarry, Jr. | G06F 17/30174 |
| | | | 707/634 |
| 2013/0117057 A1* | 5/2013 | Van Moltke | G06Q 10/025 |
| | | | 705/7.13 |
| 2013/0227028 A1* | 8/2013 | Thiel | G06F 17/30575 |
| | | | 709/206 |
| 2014/0033120 A1 | 1/2014 | Bental et al. | |
| 2014/0039944 A1* | 2/2014 | Humbert | G06Q 10/02 |
| | | | 705/5 |
| 2014/0156347 A1 | 6/2014 | Agrawal et al. | |
| 2014/0181034 A1* | 6/2014 | Harrison | G06F 17/3007 |
| | | | 707/646 |
| 2014/0236891 A1* | 8/2014 | Talius | G06F 11/00 |
| | | | 707/613 |
| 2014/0278593 A1 | 9/2014 | Brunn | |
| 2015/0112933 A1* | 4/2015 | Satapathy | G06F 17/30575 |
| | | | 707/634 |
| 2015/0127408 A1 | 5/2015 | Miller | |
| 2015/0278333 A1 | 10/2015 | Hirose et al. | |
| 2015/0302322 A1 | 10/2015 | Miller | |
| 2015/0302333 A1 | 10/2015 | Miller | |

FOREIGN PATENT DOCUMENTS

| | | |
|---|---|---|
| CA | 2679856 A1 | 9/2008 |
| EP | 2693375 A1 | 2/2014 |
| WO | WO2099769 A1 | 12/2002 |
| WO | WO2008063238 A2 | 5/2008 |
| WO | WO2015061889 A1 | 5/2015 |
| WO | WO2015161374 A1 | 10/2015 |
| WO | WO2015161375 A1 | 10/2015 |

OTHER PUBLICATIONS

Alapati, et al., SnapMirror Asynch Overview and Best Practices Guide, NetApp Tech. Report, Oct. 10, 2008.*

International Search Report and Written Opinion of the International Searching Authority dated Jan. 19, 2016 in Patent Cooperation Treaty Application No. PCT/CA2015/051057, filed Oct. 20, 2015.

International Search Report and Written Opinion of the International Searching Authority dated Jan. 22, 2015 in Patent Cooperation Treaty Application No. PCT/CA2014/000786, filed Oct. 31, 2014.

International Search Report and Written Opinion of the International Searching Authority dated Jul. 13, 2015 in Patent Cooperation Treaty Application No. PCT/CA2015/050332, filed Apr. 21, 2015.

International Search Report and Written Opinion of the International Searching Authority dated Jul. 7, 2015 in Patent Cooperation Treaty Application No. PCT/CA2015/050331, filed Apr. 21, 2015.

"Airline Enterprise Operations Solution" (Sabre Airline Solutions, Nov. 10, 2011), archived online: Airline Software Brochures | Sabre Airline Solutions <https://web.archive.org/web/20111110111315/http://www.sabreairlinesolutions.com/images/uploads/Sabre_AirCentre_Overview_Brochure_pdf>.

"Real-Time Revenue Management" (Sabre Airline Solutions, Nov. 11, 2011), archived online: Airline Management Whitepapers | Sabre Airline Solutions <https://web.archive.org/web/20111111060710/http://www.sabreairlinesolutions.com/images/uploads/Real-Time_Revenue_Management_Brochure_pdf>.

Bill Johnson, "Airline Cost Management through Operations Planning and Control", IATA Airline Cost Conference (ACC) 2013, Held Aug. 20, 2013 in Geneva (IATA, 2013), online: IATA—Airline Cost Conference 2013 <http://www.iata.org/whatwedo/workgroups/Documents/acc-2013-gva/1430-1515_OCC_JOHNSON.pdf>.

"Dynamic Operations Integration" (Sabre Airline Solutions, Nov. 11, 2011), archived online: Airline Management Whitepapers | Sabre Airline Solutions <https://web.archive.org/web/20111111053623/http://www.sabreairlinesolutions.com/images/uploads/Dynamic_Operations_Integration_pdf>.

"Efficient Operations" (Sabre Airline Solutions, Nov. 11, 2011), archived online: Airline Management Whitepapers Sabre Airline Solutions <https://web.archive.org/web/20111111060102/http://www.sabreairlinesolutions.com/images/uploads/Efficient_Operations_Brochure_pdf>.

Hanif D. Sherali, Ki-Hwan Bae & Mohamed Haouari, "A benders decomposition approach for an integrated airline schedule design and fleet assignment problem with flight retiming, schedule balance, and demand recapture" (Nov. 2013) 210:1 Annals of Operations Research 213.

"Integrated Revenue Planning" (Sabre Airline Solutions, Nov. 11, 2011), archived online: Airline Management Whitepapers | Sabre Airline Solutions <https://web.archive.org/web/20111111052737/http://www.sabreairlinesolutions.com/images/uploads/Revenue_Planning_Integration_Brochure.pdf>.

International Search Report and Written Opinion of the International Searching Authority dated Dec. 21, 2015 in Patent Cooperation Treaty Application No. PCT/CA2015/051089, filed Oct. 26, 2015.

* cited by examiner

THROTTLING SOLUTIONS INTO A LEGACY INVENTORY SYSTEM DURING A SERVICE DISRUPTION

CROSS-REFERENCE TO RELATED APPLICATIONS

The present utility patent application is related to and claims priority benefit of the U.S. provisional application No. 62/066,281, filed on Oct. 20, 2014 under 35 U.S.C. 119(e). The disclosure of the provisional application is incorporated herein by reference.

TECHNICAL FIELD

The present disclosure relates generally to data processing, and, more particularly, to methods and systems for improved management of an airline inventory during a service disruption.

BACKGROUND

Use of computerized systems in the travel and hospitality industries is advantageous both for customers and for suppliers. Computerized reservation systems facilitate storing and retrieving information as well as conducting transactions related to air travel, hotels, car rentals, and other activities. However, conventional systems have some limitations, including limited content, legacy environment, latency, and scalability. Additionally, conventional computerized systems used in the travel and hospitality industries serve limited areas of suppliers operations. Some operations are performed by operators, which makes such operations time-consuming and inefficient.

A computerized reservation system includes several components to manage different transportation areas. An airline inventory can be used to define how many seats are available on a particular flight (e.g. aircrafts, crew, and passenger name records) and is conventionally managed by a legacy inventory system. The legacy inventory system can suffer from several limitations, some of which are direct consequence of its architecture. One of these limitations is the performance of the inventory system and its limited ability to update passenger name records (PNRs) during an increased activity. These limitations can become a serious bottleneck when airline operations are affected by weather conditions, flight delays, flight cancellations, airport shutdowns, and other service disruptions. Delays in passenger re-accommodation and schedule modifications can aggravate the effect of service disruptions. The reason for this is that the legacy inventory system cannot update its inventory at a rate sufficient to handle large number of changes created by a modern system. For example, a modern re-accommodation system creates solutions for passengers at up to 100,000 or more PNR changes in just a few minutes, while the legacy inventory system can process only up to 50,000 transactions an hour. Since these changes cannot be throttled into the legacy inventory system in under an hour, the state of the inventory is unknown until the update process is complete.

Moreover, while the legacy system update is in progress, external requests for inventory can be granted and further degrade the re-accommodation process, thereby resulting in failures for many transactions associated with a re-accommodation solution. Additionally, further solutions may be run against the inventory, the status of which may be unknown. Any solution generated is likely to override the current solution being throttled, thereby introducing further confusion into the system.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment of the disclosure, system for improved management of an airline inventory during a service disruption is provided. The system for improved management of an airline inventory during a service disruption can include at least one mirror of a legacy inventory system and at least one processor in communication with the at least one mirror. The at least one mirror may be configured to receive one or more updates from a re-accommodation system. The one or more updates may be associated with one or more records of an inventory. The processor may be configured to populate the mirror with the one or more updates. Additionally, the processor may communicate the one or more updates to the legacy inventory system at a controlled rate. The one or more updates communicated to the legacy inventory system may be flagged as pending update. Furthermore, the processor may receive a confirmation that the one or more records are updated in the legacy inventory system. The confirmation may indicate synchronization of the mirror and the legacy inventory system. In response to the confirmation, the processor may unflag the one or more updates in the mirror.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In air transportation, accuracy of airline inventory and its management are significant, while difficult to obtain. Volume and complexity of airline inventory does not allow determining its exact status even under normal operating conditions. One of the reasons for that can be an uncertainty about the exact number of passengers who show up for a flight. Since the knowledge of the inventory is statistical (no absolutely accurate information of the state of the inventory), it can be assumed that there is some level of error, which can be called "Internal Systems Error of the Architecture."

Moreover, weather conditions, flight delays, flight cancellations, airport shutdowns, and other reasons may impact one or more flights and cause service disruptions in passenger journeys or itineraries. When this occurs, internal system error can increase. Re-accommodation actions, including passenger re-accommodation, alternative itineraries, re-planning for scheduling and finance, re-allocating an aircraft and crew, maintenance, and other actions provide updates to the itinerary, which require quick generation and implementation. Additionally, consistent and coherent management of the inventory is of great importance. Otherwise, the inventory and known data about the itinerary degrade.

The methods and system for improved management of an airline inventory during a service disruption described herein can significantly reduce the error and keep a coherent management of inventory through changes in schedules and various demands placed on the inventory. For this purpose, re-accommodation actions can be directed for processing to a mirror of the legacy inventory system. Corresponding changes can be introduced in the mirror and then communicated to the legacy inventory system at a controlled rate. Changes communicated to the legacy inventory system can be flagged. When certain changes are introduced to the legacy inventory system, these changes can be unflagged in the mirror.

Figure 1:
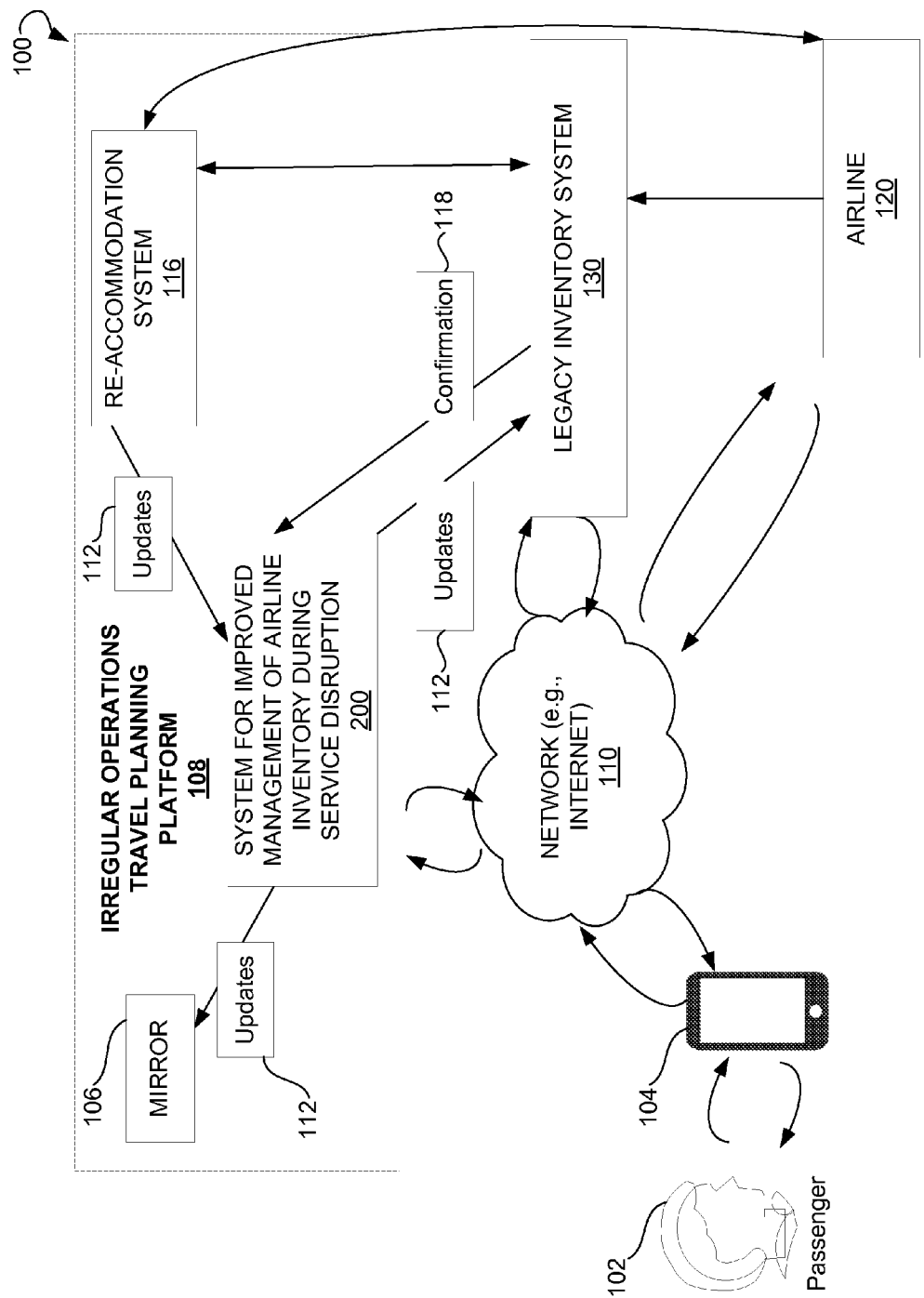
FIG. 1 illustrates an environment within which the systems and methods for improved management of an airline inventory during a service disruption can be implemented.

FIG. 1 illustrates an environment 100 within which the systems and methods for improved management of an airline inventory during a service disruption can be implemented, in accordance to some embodiments. The environment 100 may include a legacy inventory system 130 and an irregular operations travel planning platform (IROPS platform) 108. The IROPS platform 108 may include systems aimed at increasing efficiency of the legacy inventory system 130 and providing additional features and data. For the purpose of this disclosure, the IROPS platform 108 includes at least a re-accommodation system 116 and a system 200 for improved management of an airline inventory during a service disruption. Both systems 116 and 200 handle issues related to service disruption caused by weather conditions, flight delay, flight cancellation, schedule modifications, information, and so forth. The re-accommodation system 116 generates passenger re-accommodation solutions and communicates with the system 200 for improved management of an airline inventory during a service disruption and with the legacy inventory system 130 managing inventory of an airline 120. The system 200 for improved management of an airline inventory during a service disruption can communicate with a mirror 106 of the legacy inventory system 130. Even though FIG. 1 shows only one mirror 106, there can be two or more mirrors 106 communicating with the legacy inventory system 130 and the re-accommodation system 116.

The re-accommodation system 116 may receive airline events related to service disruptions. This information may be received from the airline 120 or from a network 110. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may include any suitable number and type of devices (e.g., routers and switches) for forwarding data between the systems and/or airline 120.

Additionally, the re-accommodation system 116 may receive data related to passenger, event triggers, transportation information, and other data from the airline 120 or from other sources. The data received may include personal data of each passenger (e.g. a PNR, passenger route data, passenger status, and so forth).

Based on the airline events, the re-accommodation system 116 may generate re-accommodation solutions for passengers affected by service disruption. The re-accommodation solutions may be provided to a passenger 102 for approval via a client device 104 (e.g., smartphone, tablet PC, and laptop) associated with the passenger. The response of the passenger 102 to the re-accommodation solution may be received and corresponding updates 112 to the inventory may be generated.

Updates 112 to the inventory associated with re-accommodation solutions may be sent to the system 200 for improved management of an airline inventory during a service disruption. The system 200 for improved management of an airline inventory during a service disruption sends the updates 112 to the mirror 106 and to the legacy inventory system 130. Communications of the updates 112 to the legacy inventory system 130 can be throttled at a controlled rate. The updates 112 sent to the legacy inventory system 130 can be flagged as pending update until a confirmation 118 that the updates 112 were performed in the legacy inventory system 130 is received. After the confirmation 118 is received, the updates 112 are unflagged in the mirror 106. While the updates are throttled into the legacy inventory system 130, the re-accommodation system 116 may utilize data associated with the updates on the mirror 106 as an inventory of record. External booking requests may be processed using the data of the inventory of record on the mirror 106.

Figure 2:
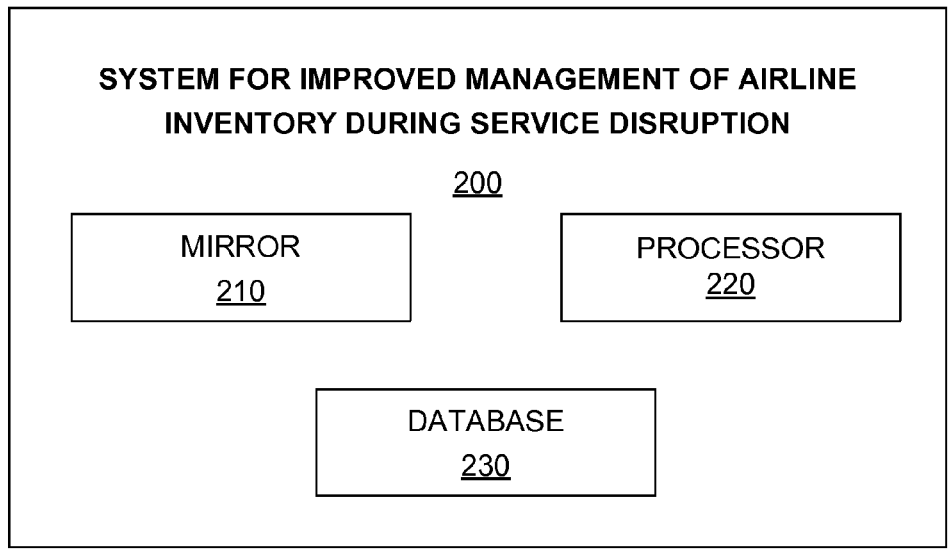
FIG. 2 is a block diagram showing various modules of the system for improved management of an airline inventory during a service disruption.

FIG. 2 is a block diagram showing various modules of the system 200 for improved management of airline inventory during service disruption, in accordance with certain embodiments. The system 200 for improved management of an airline inventory during a service disruption may comprise a mirror 210 of the legacy inventory system, a processor 220, and an optional database 230. The mirror 210 may duplicate the legacy inventory system and include all inventory data stored in the legacy inventory system, but without limitations of the legacy inventory system (e.g., performance and processing speed limitations). The mirror 210 may be configured to receive one or more updates from a re-accommodation system, wherein the one or more updates are associated with one or more records. The processor 220 may include a programmable processor, such as a microcontroller, central processing unit (CPU), and so forth. In other embodiments, the processor 220 may include an application-specific integrated circuit (ASIC) or programmable logic array (PLA), such as a field programmable gate array (FPGA), designed to implement the functions performed by the system 200. Thus, the processor 220 may populate the mirror with the one or more updates associated with service disruption. The processor 220 may communicate the one or more updates to the legacy inventory system at a controlled rate. The one or more updates communicated to the legacy inventory system may be flagged by the processor 220 as pending update. Furthermore, the processor 220 may receive a confirmation that the one or more records are updated in the legacy inventory system. The confirmation may indicate synchronization of the mirror and the legacy inventory system. In response to the confirmation, the processor 220 may unflag the one or more updates in the mirror 210. Additionally, the processor 220 may perform statistical evaluation of the inventory based on the one or more updates in the mirror and provide the statistical evaluation, for example, to an operation via a display of a client device associated with the operator. If the one or more updates of the records have failed, the processor 220 may receive a rejection associated with the one or more records. In response to the rejection, the processor 220 may update the mirror 210 to invalidate the one or more updates in the mirror 210. After the invalidation of the one or more updates, the one or more records may be returned to a state assigned to the one or more records before the one or more updates and added to a queue for generation of further updates. The database 230 may be configured to store at least data associated with the one or more updates, confirmations, rejections, and so forth.

Figure 3:
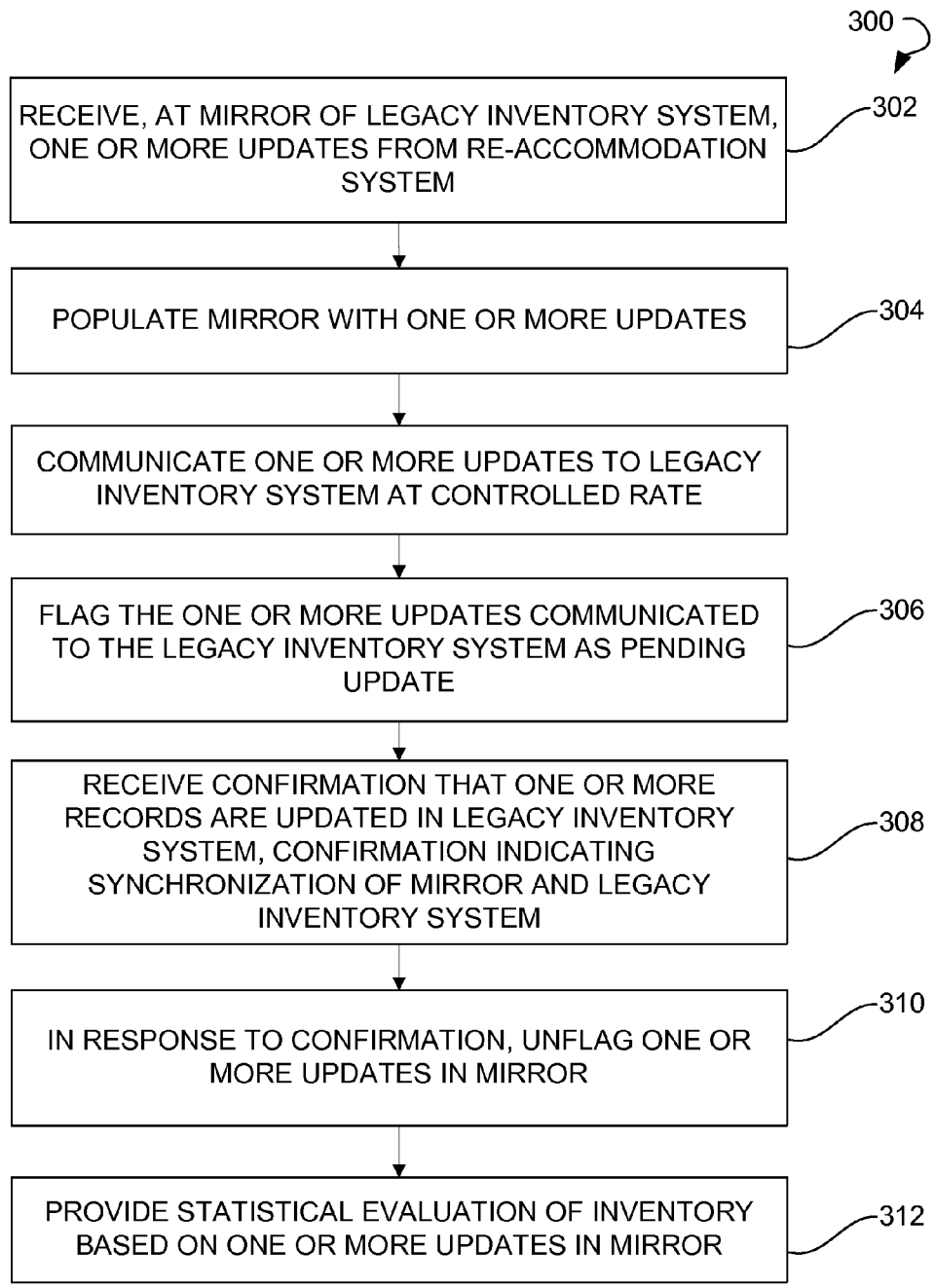
FIG. 3 is a process flow diagram showing a method for improved management of an airline inventory during a service disruption.

FIG. 3 is a process flow diagram showing a method 300 for improved management of an airline inventory during a service disruption within the environment described with reference to FIG. 1. The method 300 may commence with receiving updates from a re-accommodation system at the mirror of the legacy inventory system at operation 302. The updates may be generated by the re-accommodation system and may represent re-accommodation of one or more passengers affected by a service disruption. At operation 304, the updates may be populated into the mirror. Additionally, at operation 306, the updates may be communicated to the legacy inventory system. Considering the limitations of the legacy inventory system, the updates are communicated to the legacy inventory system gradually, at a controlled rate. The updates that are communicated to the legacy inventory system may be flagged as pending updates at operation 306.

When the updates at the legacy inventory system are done, a confirmation is received at operation 308. The confirmation indicates synchronization of the mirror and the legacy inventory system. Thus, in response to the confirmation, the updates may be unflagged in the mirror at operation 310. When the inventory on the mirror and in the legacy inventory system is synchronized, statistical evaluation of inventory based on the updates in the mirror may be provided at operation 312.

Figure 4:
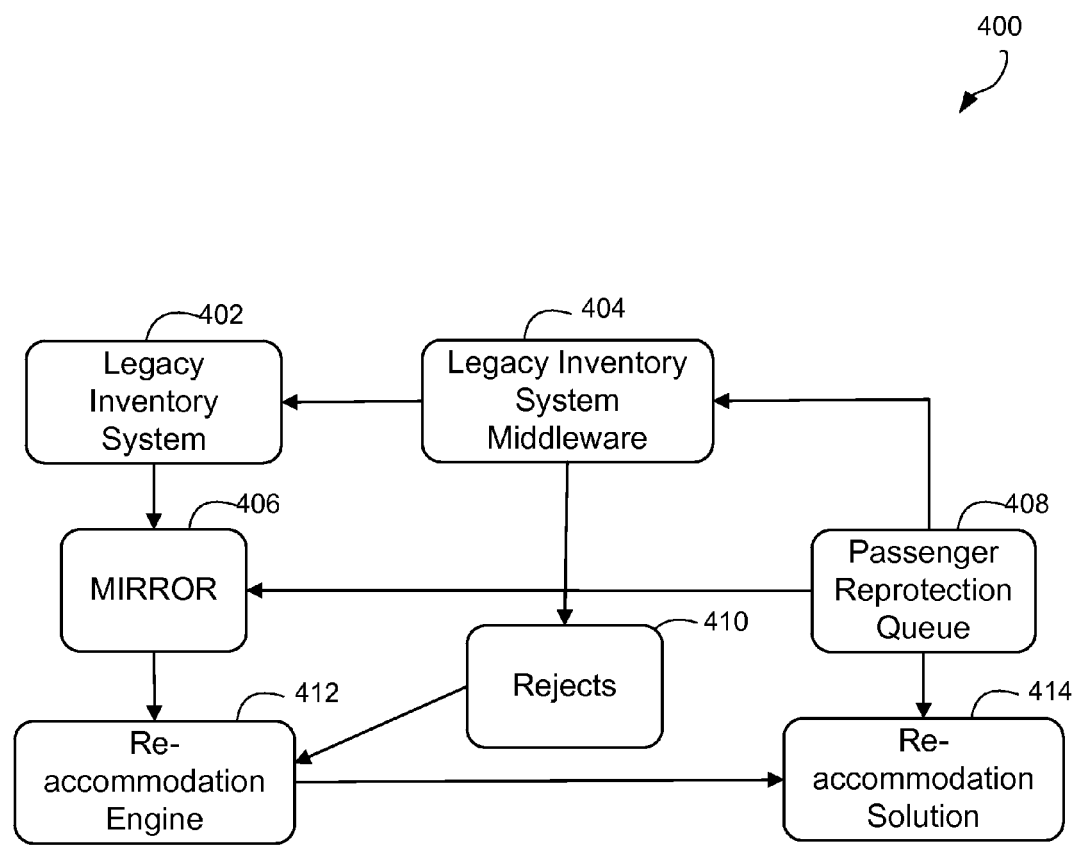
FIG. 4 shows a method for populating a mirror of a legacy inventory system.

FIG. 4 shows a representation 400 of populating the mirror 406 with updates and submitting the updates to the legacy inventory system 402 via a legacy inventory system middleware 404. Updates of PNRs may be throttled into the legacy inventory system 402 at a controlled rate and provided to a mirror 406. Updates in the mirror 406 may be flagged as pending update. When a particular PNR is updated in the legacy inventory system 402, a confirmation of the update of the PNR may be sent to the IROPS platform. When the confirmation is received, the pending update flag for that PNR may be removed.

Any transactions included in the updates that do not succeed may be returned as failed. Rejects 410 associated with failed transactions may be communicated to a re-accommodation engine 412 via the legacy inventory system middleware 404. Additionally, the mirror 406 may be updated to invalidate re-accommodation solution 414. The PNR associated with the failed transaction may be returned to its previous state and added to a passenger reprotection queue 408 for repeated generation of the re-accommodation solution 414.

New service disruption events may utilize the mirror 406 together with the updates as the system and inventory of record. Thus, latency time of throttling the legacy inventory system 402 may be avoided. The mirror 406 may provide robust and coherent inventory.

Figure 5:
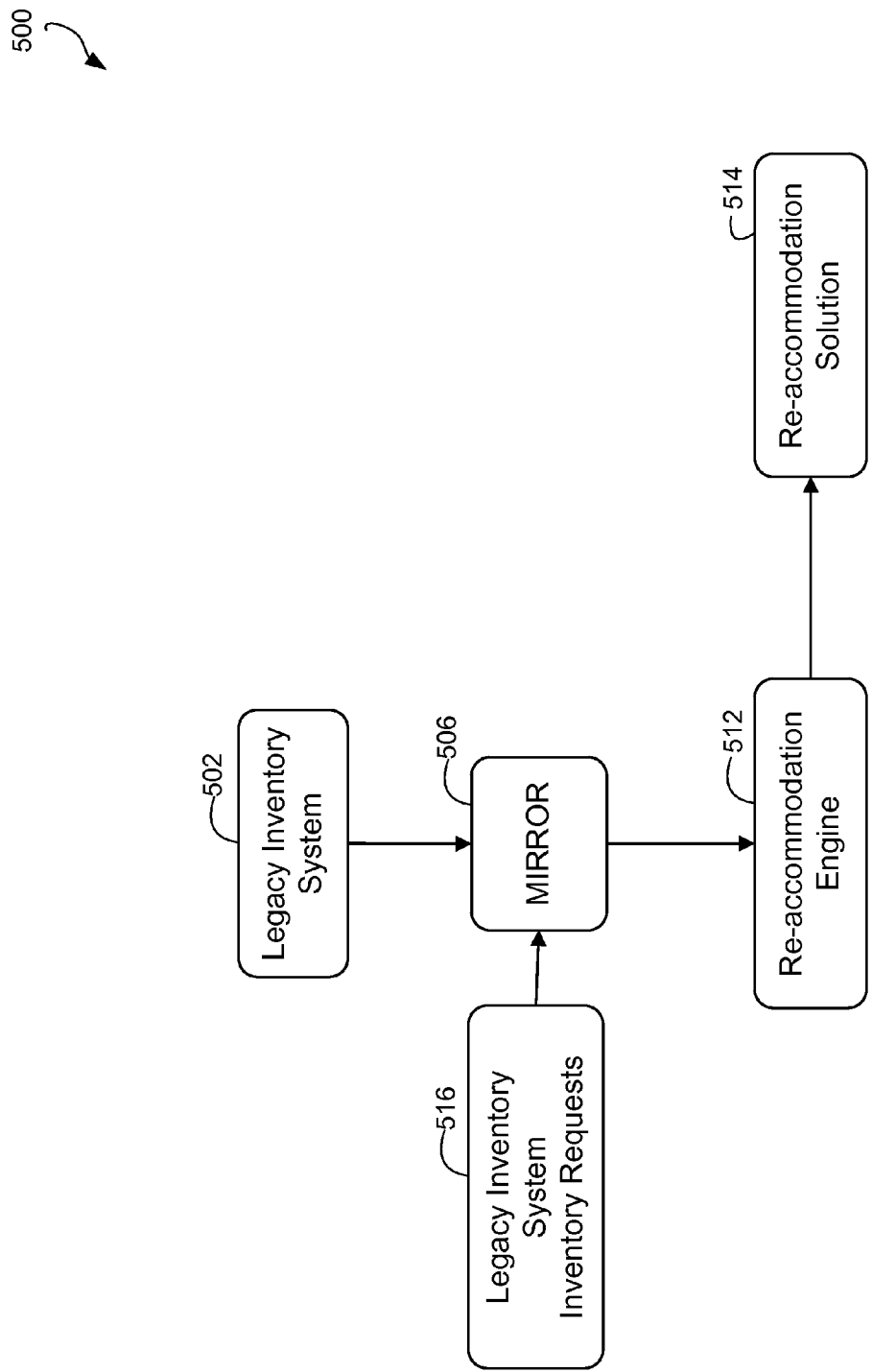
FIG. 5 shows a method for sending requests to the mirror to avoid overriding the re-accommodation solution.

FIG. 5 shows a representation 500 of forwarding inventory requests to a mirror 506 to avoid overriding a re-accommodation solution 514, in accordance with some embodiments. Part of the problem of maintaining control over the inventory is synchronizing the re-accommodation solution 514, as it is throttled into a legacy inventory system 502, with external bookings that rely on the legacy inventory system 502 for information concerning availability. In order to avoid external bookings, the re-accommodation solution 514 and/or legacy inventory system inventory requests 516 associated with the external bookings may request information about the inventory from the IROPS platform, specifically, mirror 506. The mirror 506 may provide synchronized data to a re-accommodation engine 512, which generates the re-accommodation solution 514.

Figure 6:
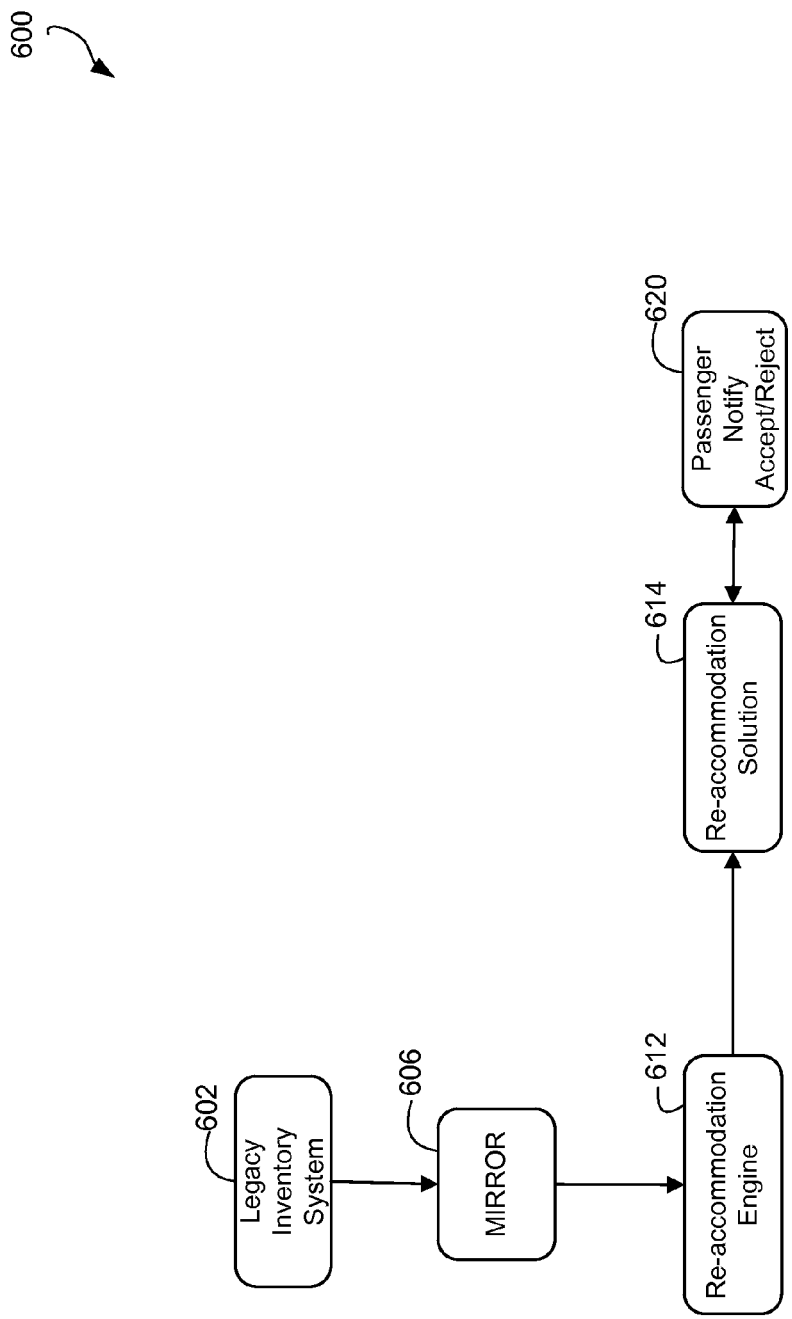
FIG. 6 illustrates passenger confirmation and interactions.

FIG. 6 shows a representation 600 of interactions with passengers concerning a re-accommodation solution 614 generated by a re-accommodation engine 612, in accordance to some embodiments. Inventory errors can be associated with the timing of when passengers are notified of their offers and the time it takes for them to respond (Accept/Reject) to the offers 620.

The longer the latency time in making an offer for reprotection, the smaller the number of offers that may be provided. The decrease in the number of offers may be caused by accepting certain offers by other passengers. Correspondingly, the uptake of offers may be diminished.

If the passengers do not respond or are slow in responding, then even if they are accepting the offer for reprotection, the airline has less information about its inventory. It is quite possible that with, for example, 100,000 solutions sent to passengers, 30,000 passengers may reject offers; and of the 70,000 who accept the offer, a substantial portion may already have alternative arrangements for their travel.

Instant communications with the passengers with timed responses is important since the passengers control the inventory. Therefore, the re-accommodation solution 614 may be provided to the passengers, for example, via mobile phone notifications, e-mails, automated calls, and so forth. The passengers may have a predefined period of time to accept one of the provided options. Information concerning passenger acceptance, rejection, or lack of action within the predefined time may be submitted to the re-accommodation engine 612. Even if 80% of the passengers respond, the re-accommodation solution 614 may be implemented.

Since the re-accommodation solution 614 is associated with the IROPS platform, the legacy inventory system 602 may have no data concerning the re-accommodation solution 614. However, the mirror 606 may have this data, since the mirror 606 may be up to date. Thus, the re-accommodation solution 614 may be implemented in the mirror 606. Furthermore, although there may be certain errors (e.g., 20%) from the passengers who have not responded, the error may be ignored, since a statistical extent to which the platform can rebook is known (no responses).

Figure 7:
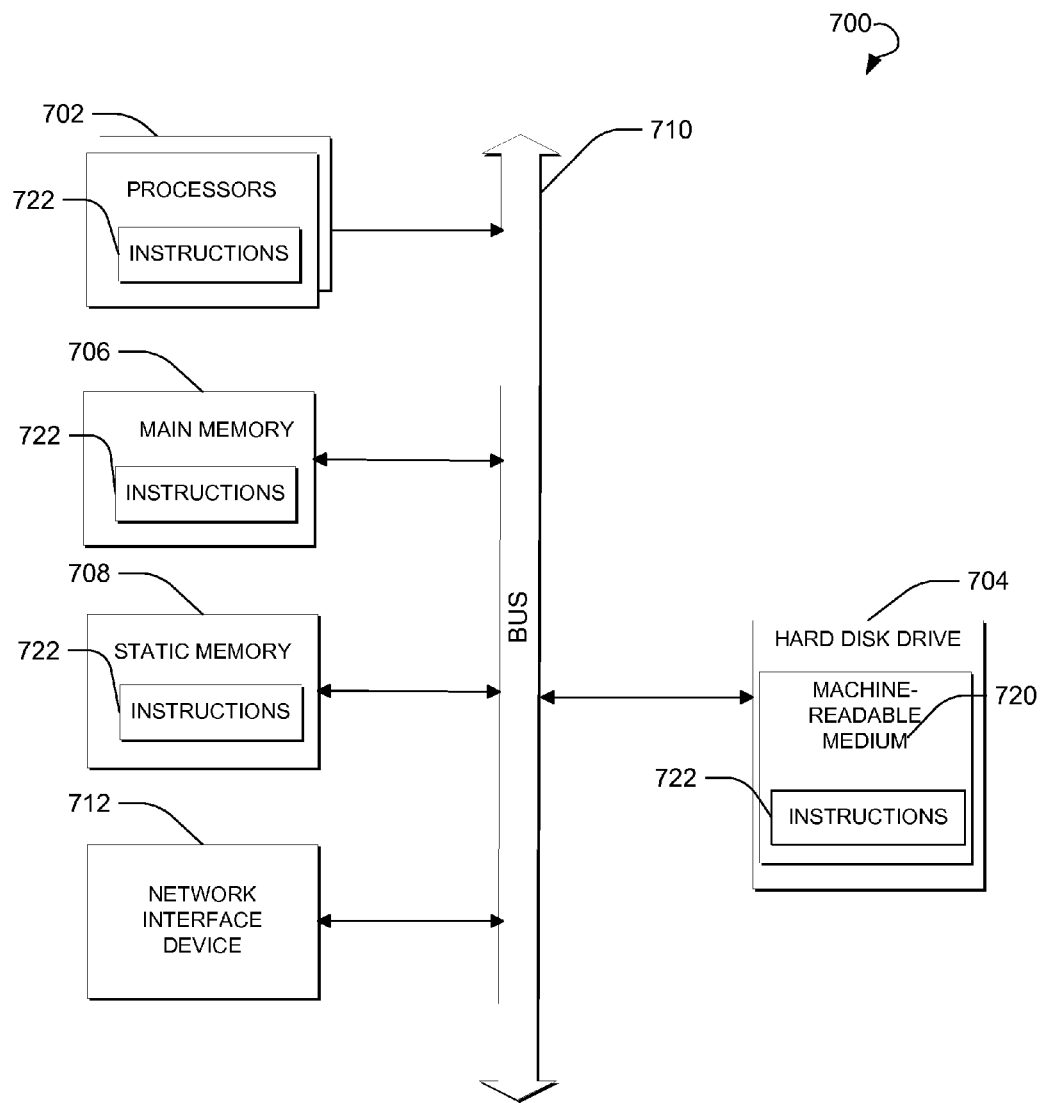
FIG. 7 shows a diagrammatic representation of a computing device for a machine in the exemplary electronic form of a computer system, within which a set of instructions for causing the machine to perform any one or more of the methodologies discussed herein can be executed.

FIG. 7 shows a diagrammatic representation of a machine in the example electronic form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box, a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU), a graphics processing unit, or both), a main memory 706 and a static memory 708, which communicate with each other via a bus 710. The computer system 700 may further include a hard disk drive 704 and a network interface device 712.

The hard disk drive 704 includes a non-transitory machine-readable medium 720, on which is stored one or more sets of instructions and data structures (e.g., instructions 722) embodying or utilized by any one or more of the methodologies or functions described herein. The instructions 722 may also reside, completely or at least partially, within the main memory 706 and/or within the processors 702 during execution thereof by the computer system 700. The main memory 706 and the processors 702 may also constitute machine-readable media.

The instructions 722 may further be transmitted or received over a network via the network interface device 712 utilizing any one of a number of well-known transfer protocols (e.g., Hyper Text Transfer Protocol).

In some embodiments, the computer system 700 may be implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system Random Access Memory (RAM). Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk, any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for improved management of an airline inventory during a service disruption are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method for improved management of an airline inventory during a service disruption, the method comprising:
   receiving, at a mirror of a legacy inventory system, one or more updates from a re-accommodation system, wherein the one or more updates are associated with one or more records;
   populating, by at least one processor, the mirror with the one or more updates;
   communicating, by the at least one processor, the one or more updates to the legacy inventory system at a controlled rate;
   flagging, by the at least one processor, the one or more updates communicated to the legacy inventory system as pending update;
   receiving, by the at least one processor, a confirmation that the one or more records are updated in the legacy inventory system, the confirmation indicating synchronization of the mirror and legacy inventory system; and
   in response to the confirmation, unflagging, by the at least one processor, the one or more updates in the mirror.

2. The method of claim 1, further comprising generating, by the re-accommodation system, the one or more updates.

3. The method of claim 1 further comprising:
   statistically evaluating, by the at least one processor, the airline inventory based on the one or more updates in the mirror; and
   providing, by the at least one processor via at least one display, the statistical evaluation of the airline inventory.

4. The method of claim 1 wherein the one or more updates are associated with re-accommodation of one or more passengers affected by a service disruption.

5. The method of claim 1 further comprising:
   receiving, by the at least one processor, a rejection associated with a record of the one or more records, the rejection indicating a failure to update the record in the legacy inventory system; and
   in response to the rejection, updating, by the at least one processor, the mirror to invalidate the one or more updates for the record in the mirror.

6. The method of claim 5, wherein the record is returned to a state assigned to the record before the one or more updates.

7. The method of claim 5, further comprising adding, by the at least one processor, the record to a queue for generation of further one or more updates.

8. The method of claim 1, wherein the re-accommodation system utilizes data of the one or more updates on the mirror as an inventory of record to generate further one or more updates for a further service disruption.

9. The method of claim 1, wherein one or more inventory requests are associated with one or more external bookings request information concerning availability of the airline inventory from the mirror.

10. A system for improved management of an airline inventory during a service disruption, the system comprising:
   at least one mirror of a legacy inventory system configured to receive one or more updates from a re-accommodation system, wherein the one or more updates are associated with one or more records; and at least one processor in communication with the at least one mirror, the at least one processor configured to:
populate the mirror with the one or more updates;
communicate the one or more updates to the legacy inventory system at a controlled rate;
flag the one or more updates communicated to the legacy inventory system as pending update;
receive a confirmation that the one or more records are updated in the legacy inventory system, the confirmation indicating synchronization of the mirror and the legacy inventory system; and
in response to the confirmation, unflag the one or more updates in the mirror.

11. The system of claim 10, wherein the re-accommodation system is operable to communicate with the at least one mirror of the legacy inventory system and to generate the one or more updates.

12. The system of claim 10, wherein the at least one processor is further configured to:
statistically evaluate the airline inventory based on the one or more updates in the mirror; and
provide the statistical evaluation of the airline inventory for representation on at least one display.

13. The system of claim 10, wherein the at least one processor is further configured to:
receive a rejection associated with a record of the one or more records, the rejection indicating a failure to update the record in the legacy inventory system; and
in response to the rejection, update the mirror to invalidate the one or more updates for the record in the mirror.

14. The system of claim 13, wherein the record is returned to a state assigned to the record before the one or more updates.

15. The system of claim 13, wherein the at least one processor is further configured to add the record to a queue for generation of further one or more updates.

16. The system of claim 10, wherein the re-accommodation system utilizes data on the mirror as an inventory of record to generate further one or more updates for a further service disruption.

17. The system of claim 16, wherein the data communicated to the re-accommodation system includes the one or more updates.

18. The system of claim 10, wherein a reservation system utilizes data on the mirror as an inventory of record to provide information on availability of the airline inventory.

19. The system of claim 10, wherein one or more inventory requests associated with one or more external bookings request information about availability of the airline inventory from the mirror.

20. A non-transitory processor-readable medium having instructions stored thereon, which when executed by one or more processors, cause the one or more processors to implement a method for improved management of an airline inventory during a service disruption, the method comprising:
receiving, at a mirror of a legacy inventory system, one or more updates from a re-accommodation system, wherein the one or more updates are associated with one or more records;
populating the mirror with the one or more updates;
communicating the one or more updates to the legacy inventory system at a controlled rate;
flagging the one or more updates communicated to the legacy inventory system as pending update;
receiving a confirmation that the one or more records are updated in the legacy inventory system, the confirmation indicating synchronization of the mirror and legacy inventory system; and
in response to the confirmation, unflagging the one or more updates in the mirror.

* * * * *